United States Patent
Tian et al.

(10) Patent No.: US 12,326,084 B1
(45) Date of Patent: Jun. 10, 2025

(54) INTELLIGENT DIRECTIONAL DEVICE FOR FULL ROTATION OF DRILL STRING

(71) Applicants: Southwest Petroleum University, Chengdu (CN); Sichuan Xieming Technology Co., Ltd., Chengdu (CN)

(72) Inventors: Jialin Tian, Chengdu (CN); Yufeng Xie, Chengdu (CN); Hengjing Zhang, Chengdu (CN); Hongsheng Deng, Chengdu (CN); Lin Yang, Chengdu (CN); Qiaolin Li, Chengdu (CN); Chunjian Huang, Chengfu (CN); Lei Cha, Chengdu (CN)

(73) Assignees: Southwest Petroleum University, Chengdu (CN); Sichuan Xieming Technology Co., Ltd., Chengdu (CN)

( * ) Notice: Subject to any disclaimer, the term of this patent is extended or adjusted under 35 U.S.C. 154(b) by 0 days.

(21) Appl. No.: 18/395,673

(22) Filed: Dec. 25, 2023

(51) Int. Cl.
E21B 7/06 (2006.01)
E21B 7/04 (2006.01)
E21B 44/00 (2006.01)

(52) U.S. Cl.
CPC ............. E21B 7/068 (2013.01); E21B 7/04 (2013.01); E21B 7/06 (2013.01); E21B 44/005 (2013.01)

(58) Field of Classification Search
CPC ... E21B 7/068; E21B 7/04; E21B 7/06; E21B 44/005; E21B 4/04; E21B 4/003
See application file for complete search history.

(56) References Cited

U.S. PATENT DOCUMENTS

| | | | | |
|---|---|---|---|---|
| 11,834,928 B1* | 12/2023 | Tian | ......... | E21B 4/003 |
| 2015/0101864 A1* | 4/2015 | May | ......... | E21B 10/32 |
| | | | | 175/27 |
| 2018/0252042 A1 | 9/2018 | Nanayakkara | | |
| 2020/0355056 A1* | 11/2020 | Harvey | ......... | E21B 7/062 |
| 2021/0254447 A1* | 8/2021 | Russell | ......... | E21B 47/18 |

FOREIGN PATENT DOCUMENTS

| | | |
|---|---|---|
| CN | 114109250 B | 3/2022 |
| CN | 114109252 B | 3/2022 |
| CN | 115387729 B | 11/2022 |
| CN | 116607882 | 8/2023 |

\* cited by examiner

*Primary Examiner* — Brad Harcourt
(74) *Attorney, Agent, or Firm* — Andrew D. Fortney; Central California IP Group, P.C.

(57) ABSTRACT

An electronically controlled full rotary clutch controller includes a drive assembly, an executive assembly and an auxiliary assembly. The device can have two working states: directional drilling and compound drilling. When compound drilling, drilling parameter information is obtained through the main control board, and the data is fed back to a ground processing system, which transmits a control signal to the main control board. The main control board controls a rotating motor, and pushes a screw sleeve and a push block shaft on a ball screw. The push block shaft pushes a push block radially, and a mandrel shell transmits torque to a roller shell through the push block. The roller shell and the mandrel shell rotate together to realize compound drilling. When directional drilling, the main control board reverses the rotary motor, the push block shaft pulls the push block radially, and the roller shell does not rotate.

4 Claims, 9 Drawing Sheets

INTELLIGENT DIRECTIONAL DEVICE FOR FULL ROTATION OF DRILL STRING

TECHNICAL FIELD

The invention relates to an intelligent directional device for realizing full rotation of a drill string in the field of drilling engineering, and its main application fields include oil and gas drilling engineering, geological exploration, etc.

BACKGROUND OF THE INVENTION

Because of long-term exploitation, shallow oil and gas resources continue to decrease, and the industry has turned its attention to deep wells. However, deep wells have complicated geology, and related oil and gas fields and other places face greater challenges in the process of oil and gas exploration and development. In order to increase mining efficiency, directional well construction technology such as horizontal wells, extended reach wells and branched wells are widely used. Directional drilling technology can not only increase drilling speed and increase oil and gas production, but also reduce the risk of drilling accidents, improve drilling safety, and reduce drilling costs. Under the background of the increasing difficulty of oilfield development and the rapid development of drilling technology, the use of directional wells for oilfield exploration and development has become a trend. There are two kinds of directional drilling technology at present, one is curved screw directional drilling technology, and the other is rotary drilling string directional drilling technology.

Curved screw directional drilling technology has the advantages of low cost, convenient use and maintenance, but in sliding directional drilling, due to the phenomenon of drag pressure, the drilling efficiency and mechanical drilling rate are low, the hole trajectory is not easy to control, the drilling cuttings are difficult to remove, and sticking accidents may happen easily. In addition, during sliding drilling, the reverse torque generated by the bit can be transmitted to the drill tool and string, resulting in unstable tool faces, affecting the continuity and speed of drilling, and wasting time and resources. In contrast, rotary steerable drilling by rotating the drill string can greatly improve drilling efficiency and avoid the problems of curved screw directional drilling. However, the manufacturing, use and maintenance costs of rotary steerable technology are high, and the risk of being buried is high.

Therefore, when the current rotary steering technology is used for directional drilling, the drill string and the upper drilling tool typically rotate together. As an independent structural unit, the guide tool does not affect the normal use of other parts of the drill tool assembly. Therefore, it can avoid the shortcomings of traditional steering technology and extend the service life of the drilling tool. However, there is a need to develop more stable, reliable and precise directional drilling technology, which can greatly improve drilling efficiency.

SUMMARY OF THE INVENTION

The invention provides an intelligent directional device for realizing full rotation of the drill string in order to solve engineering needs of directional drilling in drilling engineering, reduce the risk of drilling accidents, improve drilling efficiency and safety, and reduce drilling cost. The intelligent directional device that realizes full rotation of the drill string can have two working states: compound drilling and directional drilling. When the device is in the compound drilling state, the push block shaft pushes the push block along the radial direction, and the push block transfers the torque of the mandrel housing to the roller housing. The roller housing and the mandrel housing maintain the same motion state, and the device is in the compound drilling state. When the device is in the directional drilling state, the push block shaft pulls the push block in the radial direction, and the torque of the mandrel housing is no longer transferred to the roller housing. Only the mandrel housing rotates. The roller housing no longer rotates, and the device is in the directional drilling state.

The technical scheme of the invention includes an intelligent directional device for realizing full rotation of the drill string, which comprises an anti-drop joint, a roller housing, a side runner, a battery pack cover, an O-ring seal, a Li-ion battery pack, a main control board, a rotating motor, an insulating sleeve, a motor cover, a cylindrical roller bearing, a motor bearing cover, a coupling, a ball screw, a screw sleeve, a limit bolt, a push block shaft, a push block, and a mandrel housing.

The intelligent directional device has a drive assembly that comprises the battery pack cover (e.g., a first plate), one or more O-type sealing rings, the lithium-ion battery pack, the main control board, the rotating motor, the insulating sleeve, and the motor cover (e.g., a second plate). The battery pack cover is connected with the insulating sleeve (e.g., using a threaded connection), and the inner wall of the insulating sleeve may be coated with a layer of glass fiber (having strong heat resistance and good corrosion resistance) to maintain a temperature of the lithium ion battery pack and/or the main control board within a normal working temperature range. The rotary motor can work normally in a high temperature environment. The O-ring(s), which may comprise upper and lower O-rings, are between (i) the insulating sleeve and (ii) the battery pack cover plate and the motor cover plate, respectively, and may be configured to prevent drilling fluid from penetrating into and/or damaging the lithium-ion battery pack, the main control board and/or the rotary motor. The lithium-ion battery pack may be fixed to the insulating sleeve through a lower fixing frame. The main control board may be fixed to the insulating sleeve through a lower slot, the rotating motor may be connected to the motor cover plate with bolts, and the insulating sleeve may fit with the mandrel housing in a manner configured to ensure that some or all parts in the drive assembly and the mandrel housing move in the same or a similar manner (e.g., are in the same motion state).

Compared with other directional drilling tools, the intelligent directional device that realizes full rotation of drill string has the advantages of manufacturing ease, simple structure, high clutch operation precision and low maintenance cost. The development of this technology is of great significance to the whole drilling engineering field. The invention has the characteristics of intelligent control, low assembly requirements and high clutch accuracy.

Figure 1:
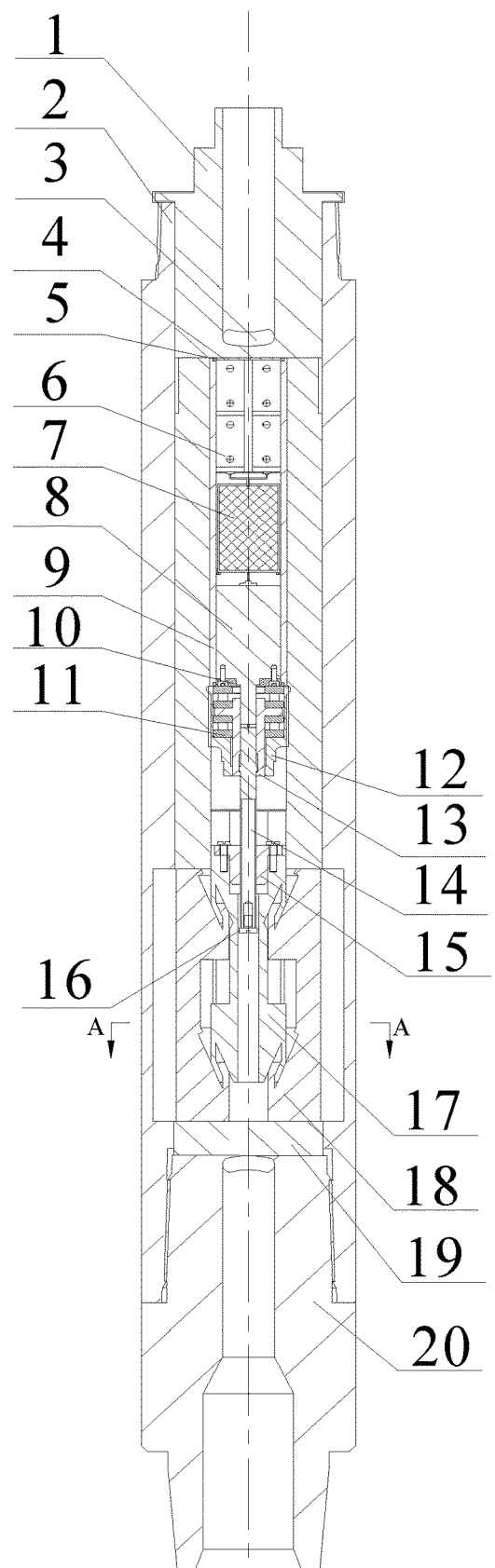
FIG. 1 is a main section view of the invention.
Figure 2:
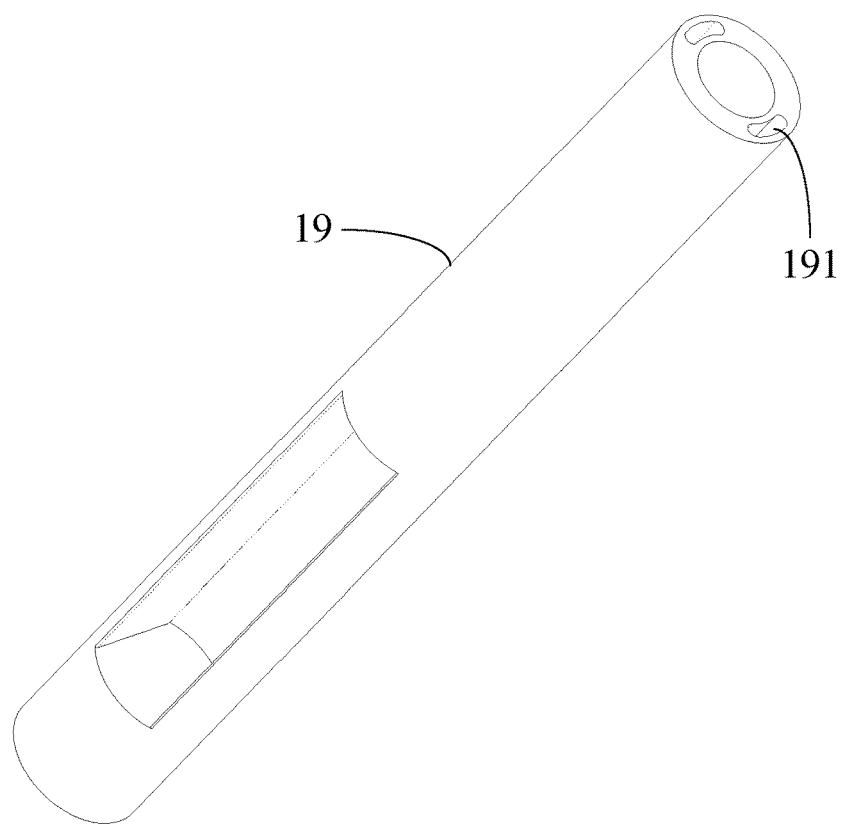
FIG. 2 is an axonometric diagram of the mandrel housing.
Figure 3:
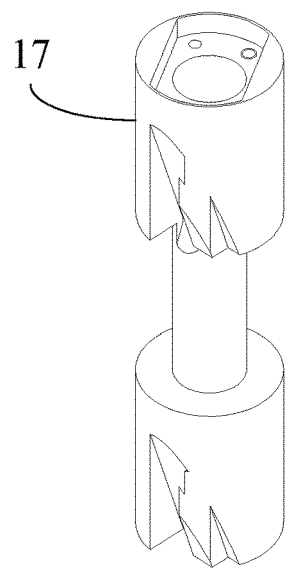
FIG. 3 is an axonometric diagram of the push block shaft.
Figure 4:
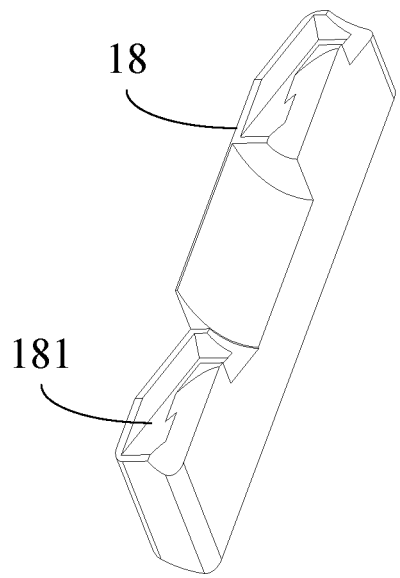
FIG. 4 is an axonometric map of the push block.

Part names in the drawings: 1—first/upper anti-drop joint, 2—roller housing, 3—side runner, 4—battery pack cover, 5—O-ring, 6—lithium-ion battery pack, 7—main control board, 8—rotating motor, 9—insulating sleeve, 10—motor cover, 11—cylindrical roller bearing, 12—motor bearing cover, 13—coupling, 14—ball screw, 15—screw sleeve, 16—limit bolt, 17—push block shaft, 18—push block, 19—mandrel housing, 191—side flow channel, 20—second/lower anti-drop joint.

DETAILED DESCRIPTION OF THE INVENTION

The present invention will be further described below in conjunction with the accompanying drawings.

Referring to FIGS. 1, 2, 3 and 4, the technical scheme of the invention includes an intelligent directional device for realizing full rotation of the drill string, which comprises a drive assembly, an executive assembly and an auxiliary assembly. Specifically, the intelligent directional device includes an anti-drop joint 1, a roller housing 2, a side runner 3, a battery pack 4, an O-ring 5, a Li-ion battery pack 6, a main control board 7, a rotating motor 8, an insulating (adiabatic) sleeve 9, a motor cover 10, a cylindrical roller bearing 11, a motor bearing cover 12, a coupling 13, a ball screw 14, a screw sleeve 15, a limit bolt 16, a push block shaft 17, a push block 18, a mandrel housing 19, and an anti-drop connector (or joint) 20.

The drive assembly of the intelligent directional device that realizes the full rotation of the drill string comprises a battery pack cover plate 4, one or more O-type sealing rings 5, a lithium ion battery pack 6, a main control board 7, a rotating motor 8, an insulating sleeve 9, and a motor cover plate 10. The battery pack cover plate 4 is connected with the insulating sleeve 9 using a threaded connection. Upper and lower O-rings 5 are between the insulating sleeve/insulation jacket 9 and (i) the battery pack cover 4 and (ii) the motor cover 10, respectively, to prevent drilling fluid from penetrating into and damaging components (e.g., within the insulating sleeve 9). The lithium-ion battery pack 6 is fixed to (and completely within) the insulating sleeve (or insulation jacket) 9 through a lower fixing frame (not identified). The main control board 7 is fixed to (and completely within) the insulation jacket 9 through a lower slot (e.g., in the insulating sleeve 9), and the rotating motor 8 is connected with the motor cover 10 using bolts. An interference fit between the insulating sleeve 9 and the mandrel housing 19 ensures that all parts in the drive assembly and the mandrel housing maintain the same state of motion (e.g., same direction, same motion type [e.g., linear, rotational, oscillating, etc.], same distance and/or angle, a combination thereof, etc.).

The executive assembly of the intelligent directional device for realizing full rotation of the drill string comprises a cylindrical roller bearing 11, a motor bearing cover 12, a coupling 13, a ball screw 14, a screw sleeve 15, a limit bolt 16, a push block shaft 17, a push block 18, a motor output shaft and a ball screw 14 are connected through a coupling, and a motor bearing cover 12 is connected with a mandrel housing 19 through a thread. The screw sleeve 15 is connected with the ball screw 14 through a threaded connection, the screw sleeve 15 is connected with the push block shaft 17 using one or more bolts, the limit bolt 16 is connected with the ball screw shaft 14 through a threaded connection, and the push block shaft 17 is radially fixed to the push block 18 through an inclined dovetail groove structure.

The auxiliary assembly of the intelligent directional device that realizes full rotation of the drill string comprises a side runner 3, a first anti-drop joint 1, a roller shell 2, a mandrel shell or housing 19, a side flow channel 191, and a second anti-drop joint 20. The side runner 3 is in fluid communication with side flow channel 191. The side runner 3 shunts the drilling fluid to the side flow channel 191. The drilling fluid passes through the side flow channel 191, and enters the anti-drop joint 20. When there is more than one side flow channel 191 in the mandrel shell or housing 19, the drilling fluid merges and/or becomes confluent at the anti-drop joint 20. The anti-drop joints or connectors 1 and 20 are threaded to opposite ends of the mandrel housing 19.

Figure 5:
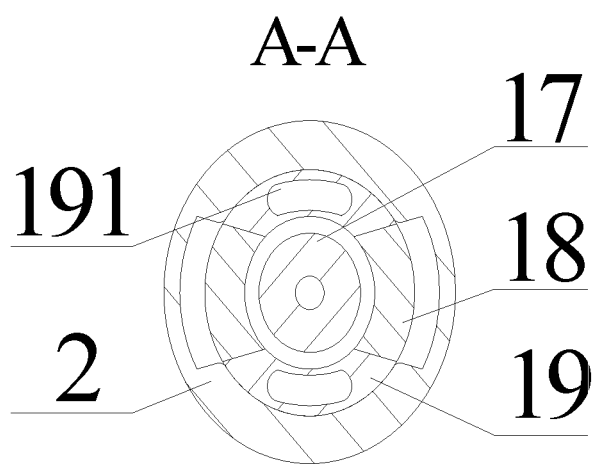
FIG. 5 is an A-A section view of the invention.

As shown at least in part in FIG. 5, the circumferential distribution or angle of each of the side runner(s) 3 (or the two side flow channels 191) and the two push blocks 18 is 90°. In compound and/or directional drilling, a measurement-while-drilling (MWD) system determines the rotation angle (e.g., of the drilling tool) so that the push block 18 is aligned with a notch 181 in the push block shaft 17, and the notch 181 may include a guide slot, which may reduce or eliminate the risk that the push block 18 cannot enter or fit in the notch 181, which can cause motor overload if it occurs.

Figure 6A:
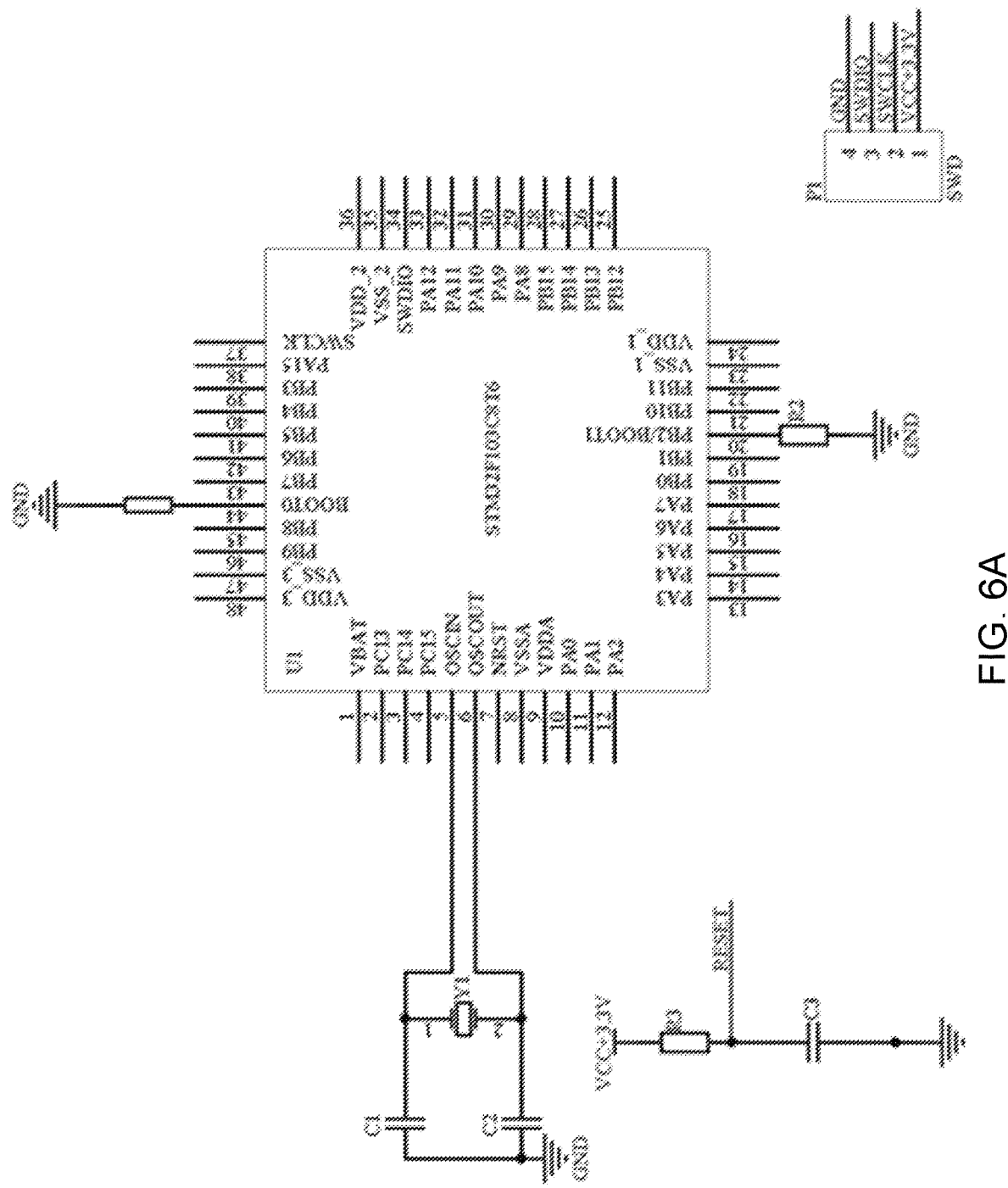
FIGS. 6A-G are circuit schematic diagrams for various modules of the main control board.
Figure 6B:
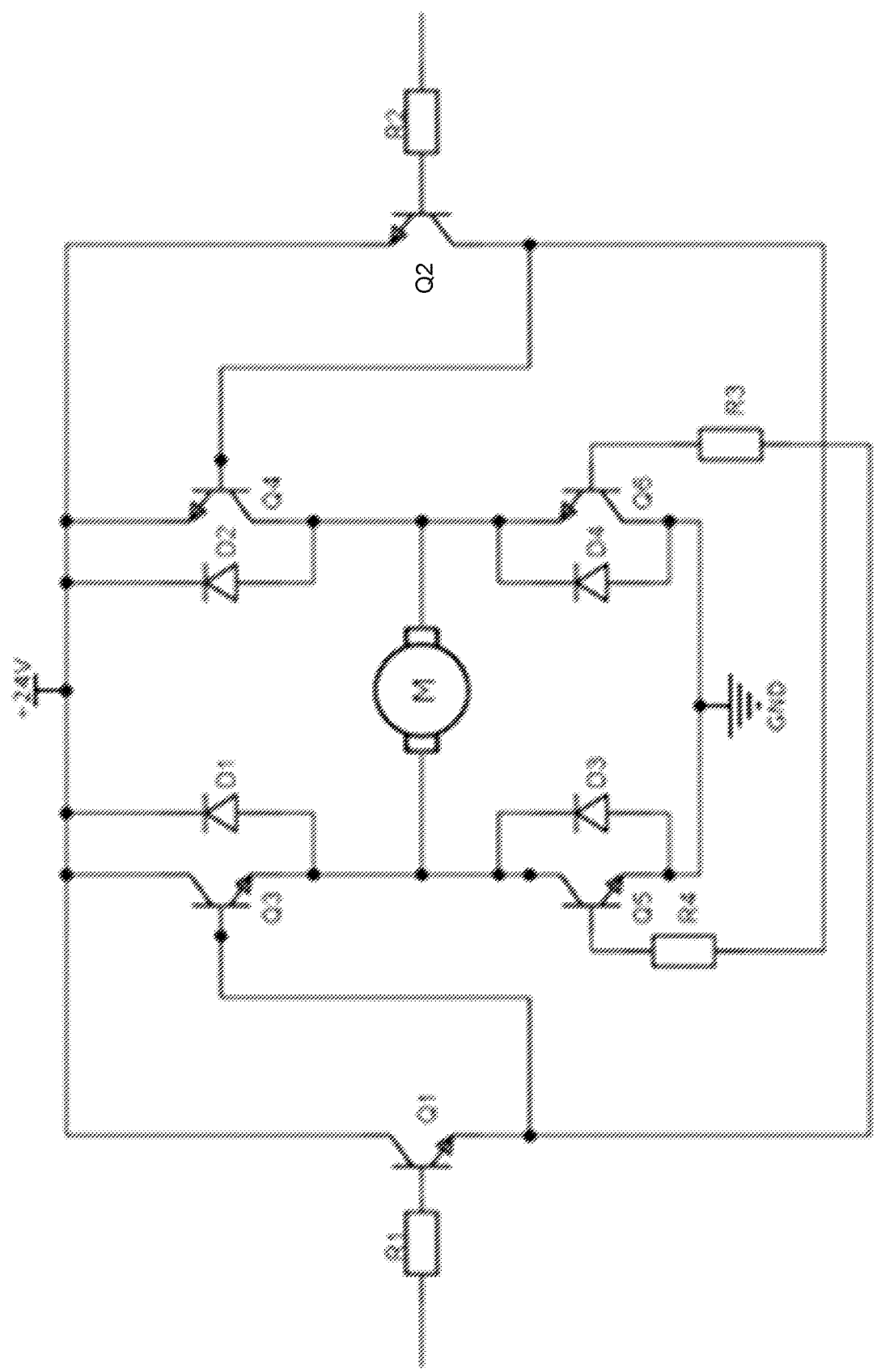
Figure 6C:
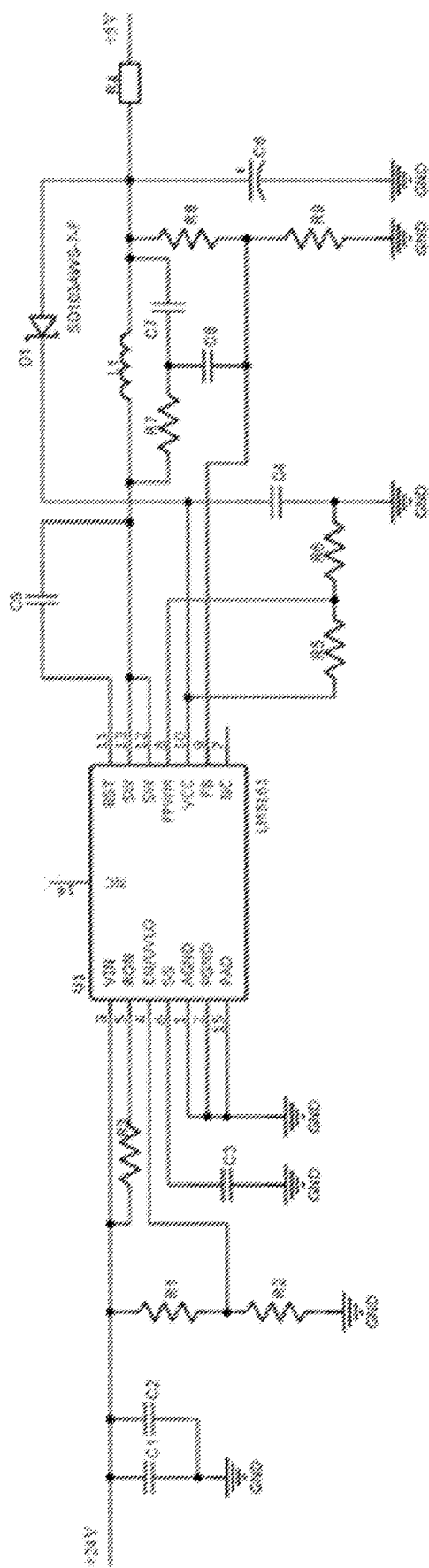
Figure 6D:
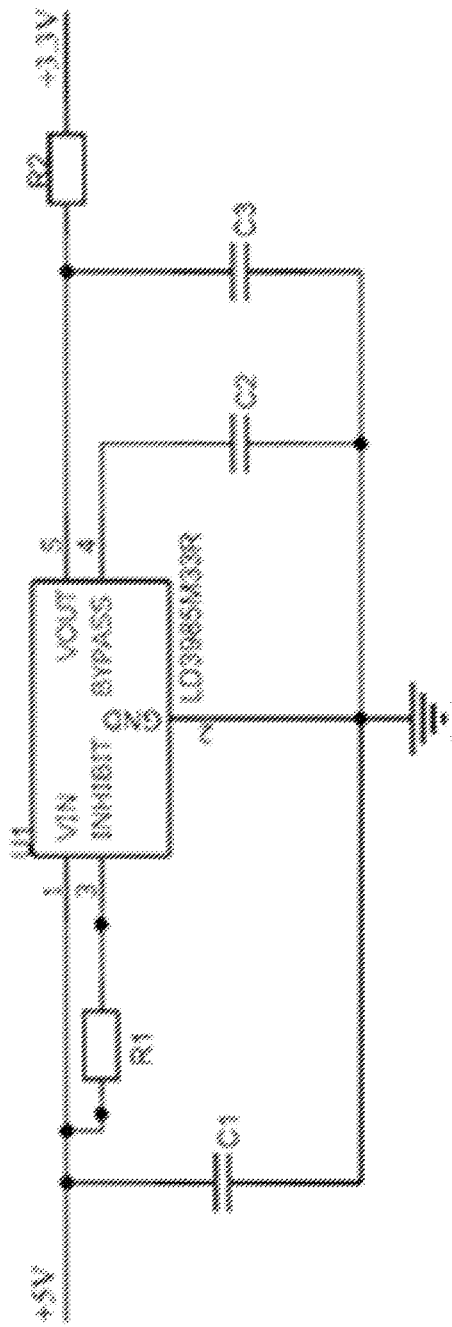
Figure 6E:
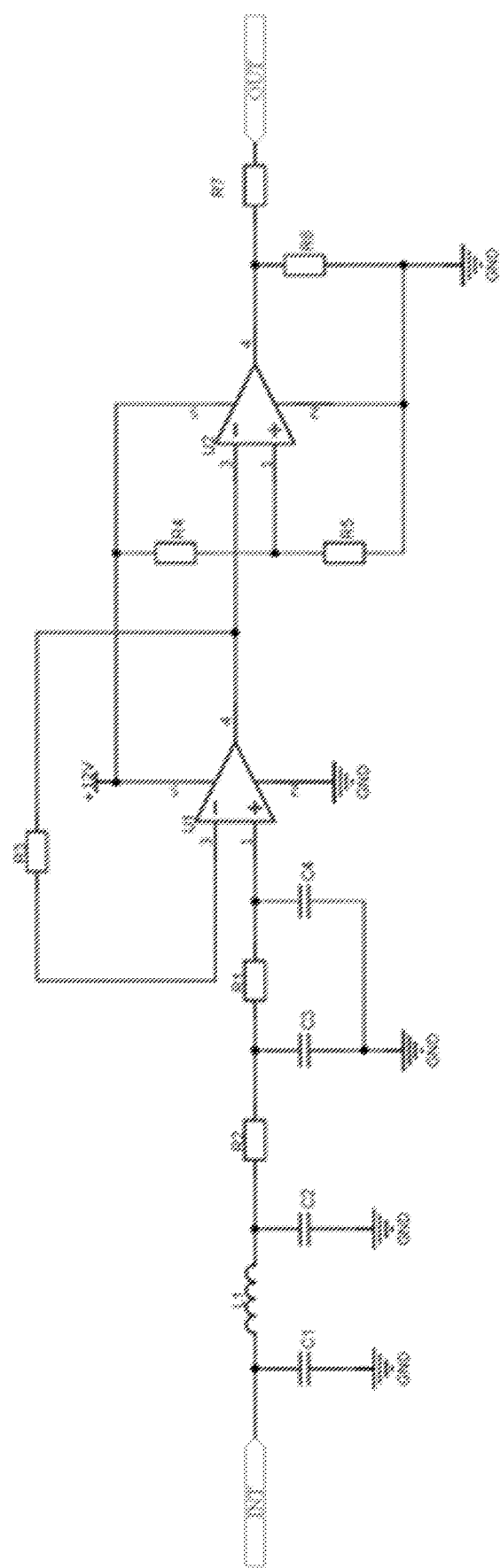
Figure 6F:
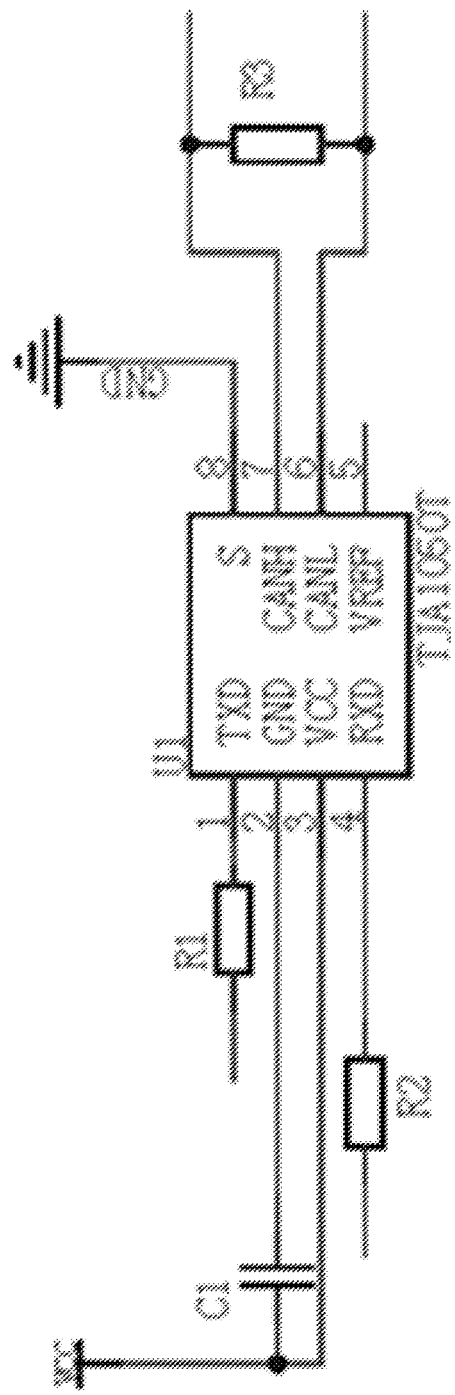
Figure 6G:
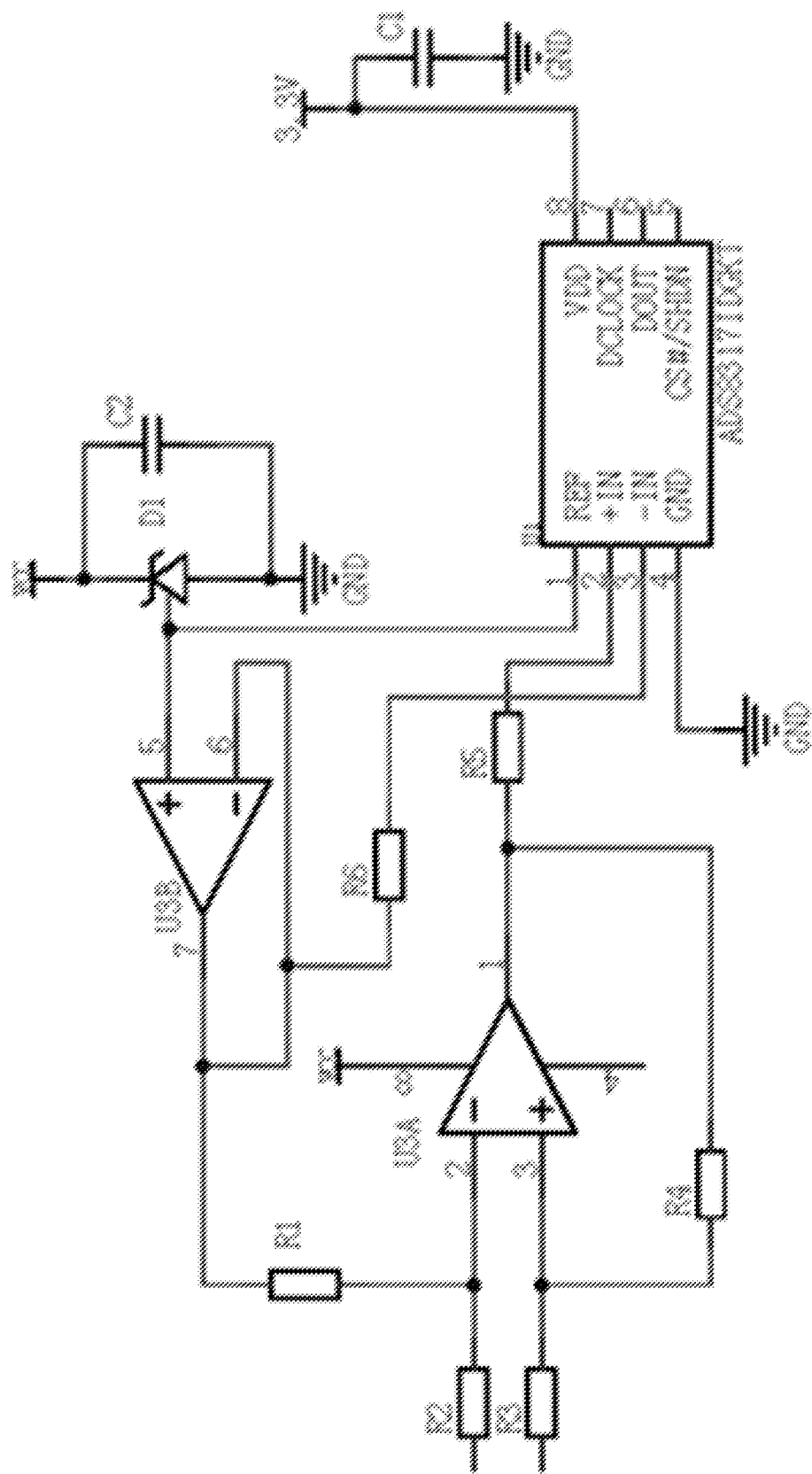

As shown in FIGS. 6A-G, the main control board 7 may include five modules: a main control module (FIG. 6A), a motor module (FIG. 6B), a power module (FIGS. 6C-D), a signal acquisition module (FIG. 6G), and a bidirectional communication module (FIG. 6F). In a specific drilling operation example, the power module components of FIG. 6C including a LM5161 chip and a transformer circuit (comprising a transformer L1, a resistor R7, and capacitors C7 and C8) convert a 24V power supply voltage into a 5V power supply, and the power module components of FIG. 6D including a LD3985M33R chip, resistors R1 and R2, and capacitors C1, C2 and C3 convert the 5V power supply into a 3.3V power supply. At least one of the LM5161 chip and the transformer circuit regulates and monitors an output voltage of the lithium-ion battery pack 6 (which may be the 24V power supply voltage), and at least one of the LM5161 chip and the LD3985M33R chip supplies power to other modules of main control board.

The motor module of FIG. 6B receives the 24V power supply voltage, and comprises a positive and negative rotation circuit configured to control positive and negative rotation of the rotating motor M (which may be the rotating motor 8). The positive and negative rotation circuit comprises resistors R1 and R2 that receive an input signal (that may be a differential signal), and bipolar transistors Q1, Q2, Q3, Q4, Q5 and Q6 and diodes D1, D2, D3 and D4 that convert the input signal from the resistors R1 and R2 to positive or negative rotation signals for the motor M. The positive and negative rotation circuit may further comprise resistors R3 and R4 that respectively receive outputs from the bipolar transistors Q1 and Q2 and provide (filtered) signals to the bipolar transistors Q5 and Q6.

The signal acquisition module (FIG. 6G) comprises an ADS831IDGKT chip that receives the 3.3 V power supply and a processing circuit. The processing circuit receives the 5V power supply (VCC) and comprises a Schottky diode D1, a capacitor C2, differential or operational amplifiers U3A and U3B, and resistors R1 through R6. When drilling, the signal acquisition module of the main control board 7 obtains drilling parameter information (e.g., as a differential input signal at the differential amplifier U3A from resistors R2 and R3), and processes the collected parameter information by filtering, amplifying, and modulating or demodulating the differential input signal (or a single-ended version thereof) using various components of the processing circuit.

The bidirectional communication module (FIG. 6F) receives the 5V power supply or the 3.3V power supply, as well as the drilling parameter information (e.g., as a differential input signal at terminals CANH and CANL of a TJA1050T chip), and feeds back the parameter information (e.g., from or on terminal TXD of the TJA1050T chip) to a surface processing system (not shown). The bidirectional communication module receives a drilling control signal (e.g., a composite drilling signal) from the surface processing system at or on terminal RXD of the TJA1050T chip.

The main control module (FIG. 6A) comprises a STM32F103C8T6 chip (or other microprocessor or microcontroller core with embedded flash memory and embedded static random access memory [SRAM]), a crystal oscillator circuit, a reset circuit, and a debugging circuit, and receives the 3.3V power supply (e.g., at one or more of VDDA, VDD_1, VDD_2 and VDD_3) and the drilling control signal (e.g., at one or more of the input-output terminals PA0-PA12, PA15, PB0-PB1, PB3-PB15 and PC13-PC15). The main control module controls the rotating motor 8 (e.g., by outputting one or more motor control signals on one or more of the input-output terminals PA0-PA12, PA15, PB0-PB1, PB3-PB15 and PC13-PC15), and may receive, process, store and/or provide some or all of the drilling parameter signals and/or values (e.g., on one or more of the input-output terminals PA0-PA12, PA15, PB0-PB1, PB3-PB15 and PC13-PC15). The motor module (FIG. 6B) controls the positive and/or negative rotation of the rotating motor 8. The crystal oscillator circuit in FIG. 6A comprises a crystal oscillator Y1 and capacitors C1 and C2, and outputs a periodic (clock) signal (which may be differential) to the microprocessor or microcontroller STM32F103C8T6 at the OSCIN and OSCOUT terminals. The reset circuit comprises an RC circuit (e.g., resistor R3 and capacitor C3) that outputs a reset signal RESET to the microprocessor or microcontroller STM32F103C8T6 (e.g., at the NRST terminal), typically after a power cycle event (e.g., loss of power, optionally followed by a return of the power supply). The debugging circuit P1 receives the 3.3V power supply, and may send data to and/or receive data from the microprocessor or microcontroller STM32F103C8T6 (e.g., on or at the respective SWDIO terminals), as well as a periodic (clock) signal (which may be single-ended) on or at the respective SWCLK terminals.

Referring back to FIG. 1, the motor output shaft (not identified, but which may be in an opening defined by the roller bearing[s] 11 and the coupling 13) transmits torque from the motor 8 to the ball screw 14 through the coupling 13. The screw sleeve 15 and the push block shaft 17 are lowered on the ball screw 14 as a whole, and the push block shaft 17 (which may have a partially conical structure) pushes the push block 18 out in the radial direction. The push block 18 may be attached to or in contact with the side of the roller housing 2 and the mandrel housing 19. As the push block(s) 18 rotate (a result of the torque from the ball screw 14 causing the push block shaft 17 and the push block[s] 18 to rotate), the mandrel housing 19 transfers the torque from the push block(s) 18 to the roller housing 2, and the roller housing 2 and the mandrel housing 19 maintain the same motion state (e.g., rotation, in the same direction and optionally at the same rotation rate) to realize compound drilling.

Similarly, when directional drilling, the signal acquisition module of the main control board 7 acquires drilling parameter information, and processes the acquired parameter information (e.g., by filtering, amplifying, modulating and/or demodulating the information). The two-way communication module feeds back the parameter information to the surface processing system, and then the receiving coil of the two-way communication module receives the directional drilling signal sent by the surface processing system. The main control module receives the signal and controls the rotating motor 8, and the motor module controls the rotating motor 8 to reverse.

The motor output shaft transmits the torque to the ball screw 14 through the coupling 13. The screw sleeve 15 and the push block shaft 17 move upward on the ball screw 14, the push block shaft 17 pulls the push block(s) 18 in the radial direction, and the side (e.g., the contact surface) of the push block(s) 18 are separated from the mandrel shell 19. At this time, the roller shell 2 does not rotate, only the mandrel shell 19 rotates. The torque from the mandrel housing 19 is no longer transmitted to the roller housing 2, thereby enabling directional drilling.

Figure 7:
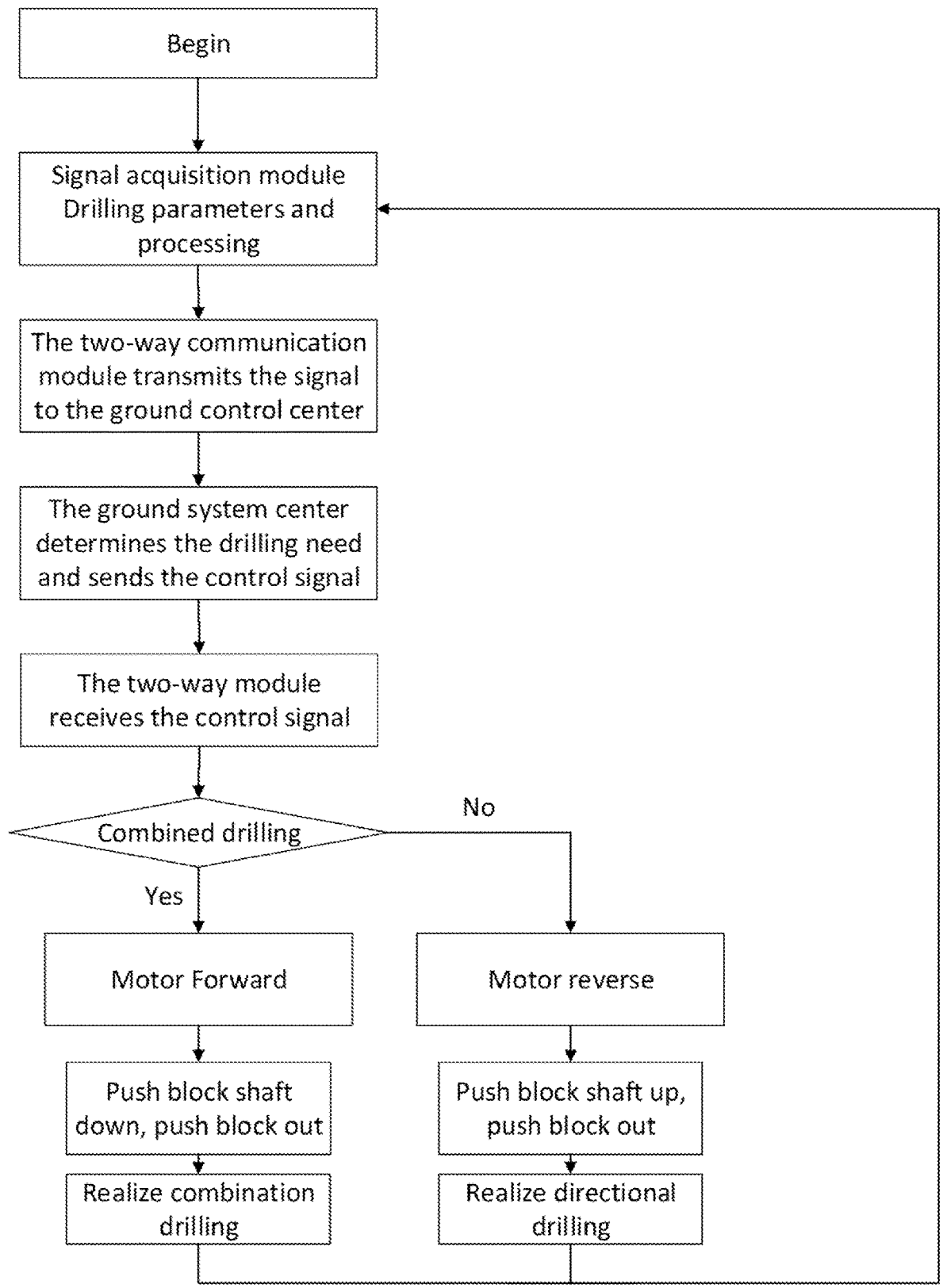
FIG. 7 is a flowchart for an exemplary method of using the intelligent directional device that realizes full rotation of drill string.

FIG. 7 shows an exemplary flow chart for a method of using the intelligent orientation device to drill into the Earth in either or both of two operational modes, directional drilling and combination or compound drilling. The text and flow (e.g., directional arrows) shown in FIG. 7 are incorporated herein by reference.

Finally, it should be noted that the above is only a preferred embodiment of the invention and does not constitute any limitation of the invention. Although the present invention is described in detail by reference to the above-mentioned embodiments, it is still possible for persons skilled in the art to modify the technical scheme recorded in the above-mentioned embodiments or equivalent to replace some of the technical features. Any modification made within the spirit and principles of the invention, equivalent to replacement, improvement, etc., shall be included in the scope of protection of the invention.

The invention claimed is:

1. An intelligent orientation device configured to achieve full rotation of a drill string, comprising a drive assembly, an executive assembly and an auxiliary assembly;

the drive assembly of the intelligent orientation device configured to achieve full rotation of a drill string comprises a battery pack cover plate, an upper O-shaped sealing ring, a lower O-shaped sealing ring, a lithium-ion battery pack, a main control board, a rotating motor, an insulating sleeve, and a motor cover plate:

wherein the battery pack cover plate is connected with the insulating sleeve by threads;

the upper O-shaped sealing ring is placed between the battery pack cover plate and the insulating sleeve, and the lower O-shaped sealing ring is placed between the battery pack cover plate and the motor cover plate so as to prevent drilling fluid infiltration;

the lithium-ion battery pack is fixed to the insulating sleeve through a fixing frame below the lithium-ion battery pack;

the main control board is fixed to the insulating sleeve through a clamp groove below the main control board;

the rotating motor is connected with the motor cover plate by bolts;

the insulating sleeve is interference fit with a mandrel housing, the executive assembly of the intelligent orientation device configured to achieve full rotation of a drill string comprises two cylindrical roller bearings, a motor bearing cover, a coupling, a ball screw, a screw sleeve, a limit bolt, a push block shaft, and a push block:

wherein the two cylindrical roller bearings are respectively provided on an upper side and a lower side of the coupling;

the motor bearing cover is connected with the mandrel housing by bolts to achieve a circumferential fixation;

the coupling connects the rotating motor axially with the ball screw;

the screw sleeve is connected with the ball screw by threads;

the screw sleeve is connected with the push block shaft by bolts;

the limit bolt is connected with the ball screw by threads;

the push block shaft is fixed radially with the push block by an inclined dovetail groove structure, the auxiliary assembly of the intelligent orientation device configured to achieve full rotation of a drill string comprises a side runner, an anti-drop upper joint, a roller housing, the mandrel housing, a side flow channel, and an anti-drop lower joint, wherein the side runner is configured to divert drilling fluid away from the drive assembly and the executive assembly, the roller housing is connected to the mandrel housing, the anti-drop upper joint and the anti-drop lower joint are respectively connected to the mandrel housing by threads, the motor bearing cover is connected to the mandrel housing by threads, thus, the anti-drop upper joint, the motor bearing cover, the mandrel housing, and the anti-drop lower joint maintain the same motion state;

the lithium-ion battery pack, the main control board, the rotating motor, and the insulating sleeve of the drive assembly are fixed in circumferential direction;

during drilling operations, the battery pack cover plate, the O-shaped sealing ring, the lithium-ion battery pack, the main control board, the rotating motor, the insulating sleeve, and the motor cover plate always maintain the same motion state as the mandrel housing;

the anti-drop upper joint is provided with two 180° circumferential side runners, the mandrel housing is provided with the side flow channel, the side runner is communicated with the side flow channel to ensure that the drilling fluid is diverted from the side runner of the anti-drop upper joint to the side flow channel of the mandrel housing, and then converges back to a center of the drill string at the anti-drop lower joint; and when a clutch controller needs to switch states during drilling operations, the push block is aligned with a notch of the roller housing, and the push block shaft smoothly pushes out and retracts the push block; at the same time, a guide groove is provided at the notch of the roller housing, and a chamfer is provided on a contact edge between the push block and the roller housing, thereby effectively avoiding a deviation of a rotation angle of the rotating motor due to small disturbances, which causes the push block to be unable to be smoothly pushed out and the rotating motor to be overloaded.

2. The intelligent orientation device according to claim 1, wherein the main control board comprises a main control module, a motor module, a power module, a signal acquisition module and a bidirectional communication module:

wherein the main control module comprises a STM32F103C8T6 chip, a crystal oscillator circuit, a reset circuit, and a debugging circuit;

the motor module comprises a positive and negative rotation circuit configured to control positive and negative rotation of the rotating motor;

the power module includes a LM5161 chip, a LD3985M33R chip and a transformer circuit, configured to regulate and monitor an output voltage of the lithium-ion battery pack, and supply power to other modules of the main control board;

the signal acquisition module comprises an ADS831IDGKT chip and a processing circuit, configure to collect drilling parameter information and process a collected signal by filtering, amplifying, modulation and/or demodulation; and the bidirectional communication module comprises a TJA1050T chip to realize low-frequency remote wireless transmission, feedback the drilling parameter information that has been processed to the main control module and receive a control signal from the main control module.

3. The intelligent orientation device according to claim 1, wherein the insulating sleeve effectively isolates heat generated by friction of the mandrel housing when rotating and ensures that a temperature of the lithium-ion battery pack, the main control board and the rotating motor remains in a normal working temperature range.

4. The intelligent orientation device according to claim 1, wherein the roller housing and the mandrel housing are connected to effectively reduce loss of transferred energy and improve transfer efficiency of the drilling tool.

* * * * *